(12) United States Patent
Hill et al.

(10) Patent No.: US 8,669,516 B2
(45) Date of Patent: Mar. 11, 2014

(54) USING LWT SERVICE TO IDENTIFY LOSS CIRCULATION AREAS IN A WELLBORE

(75) Inventors: Freeman L. Hill, Spring, TX (US); John G. Evans, The Woodlands, TX (US)

(73) Assignee: Baker Hughes Incorporated, Houston, TX (US)

( * ) Notice: Subject to any disclaimer, the term of this patent is extended or adjusted under 35 U.S.C. 154(b) by 306 days.

(21) Appl. No.: 13/167,912

(22) Filed: Jun. 24, 2011

(65) Prior Publication Data

US 2012/0043459 A1 Feb. 23, 2012

Related U.S. Application Data

(63) Continuation-in-part of application No. 12/972,213, filed on Dec. 17, 2010.

(60) Provisional application No. 61/375,618, filed on Aug. 20, 2010.

(51) Int. Cl.
*E21B 47/10* (2012.01)
*G01V 5/04* (2006.01)

(52) U.S. Cl.
USPC ............................................ 250/260; 250/258

(58) Field of Classification Search
USPC ................................................. 250/259, 260
See application file for complete search history.

(56) References Cited

U.S. PATENT DOCUMENTS

| | | | | |
|---|---|---|---|---|
| 2,480,674 | A | * | 8/1949 | Russell .......................... 376/167 |
| 4,653,597 | A | | 3/1987 | Johnson |
| 5,077,471 | A | * | 12/1991 | Smith et al. .................... 250/260 |
| 5,448,477 | A | * | 9/1995 | Delatorre et al. ................ 702/6 |
| 6,727,696 | B2 | | 4/2004 | Kruspe et al. |
| 7,341,106 | B2 | | 3/2008 | Reddy et al. |
| 7,402,797 | B2 | | 7/2008 | Pemper et al. |
| 7,446,308 | B2 | | 11/2008 | Gilchrist et al. |
| 7,507,692 | B2 | | 3/2009 | Xiang |
| 7,705,099 | B2 | | 4/2010 | Hoskins |
| 7,767,629 | B2 | | 8/2010 | Shinbach et al. |
| 7,933,718 | B2 | | 4/2011 | McDaniel et al. |
| 7,950,451 | B2 | | 5/2011 | Alberty |
| 2008/0179509 | A1 | | 7/2008 | Jacobi et al. |
| 2009/0294174 | A1 | | 12/2009 | Harmer et al. |
| 2009/0326826 | A1 | * | 12/2009 | Hull et al. ........................ 702/8 |

OTHER PUBLICATIONS

G. Heisig et al., "Downhole Diagnosis of Drilling Dynamics Data Provides New Level Drilling Process Control to Driller," Society of Petroleum Engineers (SPE 49206).

\* cited by examiner

*Primary Examiner* — Casey Bryant
(74) *Attorney, Agent, or Firm* — Mossman Kumar & Tyler PC

(57) ABSTRACT

The present disclosure relates to apparatus and methods for evaluating an earth formation though a drillstring during tripping of the drillstring, particularly locating an area of circulation loss in a wellbore. The apparatus may include a neutron source and at least one radiation detector, which may be disposed on a logging instrument, configured to be dropped or pumped into a drillstring at the end of drilling. The logging instrument may be configured to make measurements through a homogenous portion of the drillstring while the drillstring is being tripped. The apparatus may include a memory and processor for logging data for later retrieval. The method may include adding a radiation absorbing substance to drilling fluid in the wellbore; exposing the earth formation to neutron radiation; and making a plurality of measurement indicative of radiation measurements of sigma or distinct energy peaks along the wellbore.

17 Claims, 7 Drawing Sheets

USING LWT SERVICE TO IDENTIFY LOSS CIRCULATION AREAS IN A WELLBORE

CROSS-REFERENCES TO RELATED APPLICATIONS

This application is a continuation-in-part of U.S. patent application Ser. No. 12/972,213, filed on Dec. 17, 2010, and claims priority from the aforementioned application and from U.S. provisional patent application Ser. No. 61/375,618, filed on Aug. 20, 2010.

BACKGROUND OF THE DISCLOSURE

1. Field of the Disclosure

This disclosure relates to systems, devices, and methods of logging an earth formation through a drillstring during tripping of the drillstring.

2. The Related Art

Logging While Tripping (LWT) presents a cost-effective alternative or addition to Logging While Drilling (LWD) and Measurement While Drilling (MWD) techniques in horizontal, deviated, or vertical wells. In LWT, a small diameter "run-in" tool is sent downhole through the drill pipe, at the end of a bit run or drilling, just before the drill pipe is pulled. The term "bit run" refers to the drillbit wearing out and having to be replaced. The run-in tool is used to measure the downhole physical quantities as the drill string is extracted or tripped out of the hole. Measured data is recorded into tool memory versus time during the trip out. At the surface, a second set of equipment records bit depth versus time for the trip out, and this allows the measurements to be placed on depth.

The present disclosure is directed towards a real-time or memory LWT that does not require special modification to the drillstring.

SUMMARY OF THE DISCLOSURE

In aspects, the present disclosure is related to systems, devices, and methods for locating leaks in a wellbore in the earth formation.

One embodiment according to the present disclosure includes a method for locating a leak in a wellbore in an earth formation, the method comprising: adding a radiation absorbing substance to a drilling fluid in the wellbore; conveying a neutron source and at least one radiation detector along at least part of the wellbore through a drilling tubular, the at least one radiation detector being responsive to an interaction between the neutron source and the earth formation; and identifying a location indicative of the leak using the output of the at least one sensor.

Another embodiment according to the present disclosure includes an apparatus for locating a leak in a wellbore in an earth formation, the apparatus comprising: a neutron source configured to be conveyed along at least part of the wellbore; at least one radiation detector configured to be conveyed along at least part of the wellbore through a drilling tubular and configured to provide an output indicative of an interaction between the neutron source and the earth formation; and a radiation absorbing substance conveyed in a drilling fluid and configured to accumulate at a location indicative of the leak.

Another embodiment according to the present disclosure includes a non-transitory computer readable medium product having thereon instructions that when read by a processor cause the processor to execute a method, the method comprising: identifying a location indicative of a leak in a wellbore in an earth formation using an output of at least one radiation detector conveyed in a drilling tubular, the at least one radiation detector responsive to an interaction between radiation from a neutron source and the earth formation, wherein the output of the at least one radiation detector is affected by an accumulation of a radiation absorbing substance at the location indicative of the leak.

Examples of the more important features of the disclosure have been summarized rather broadly in order that the detailed description thereof that follows may be better understood and in order that the contributions they represent to the art may be appreciated.

BRIEF DESCRIPTION OF THE DRAWINGS

For a detailed understanding of the present disclosure, reference should be made to the following detailed description, taken in conjunction with the accompanying drawing.

DETAILED DESCRIPTION OF THE DISCLOSURE

Figure 1:
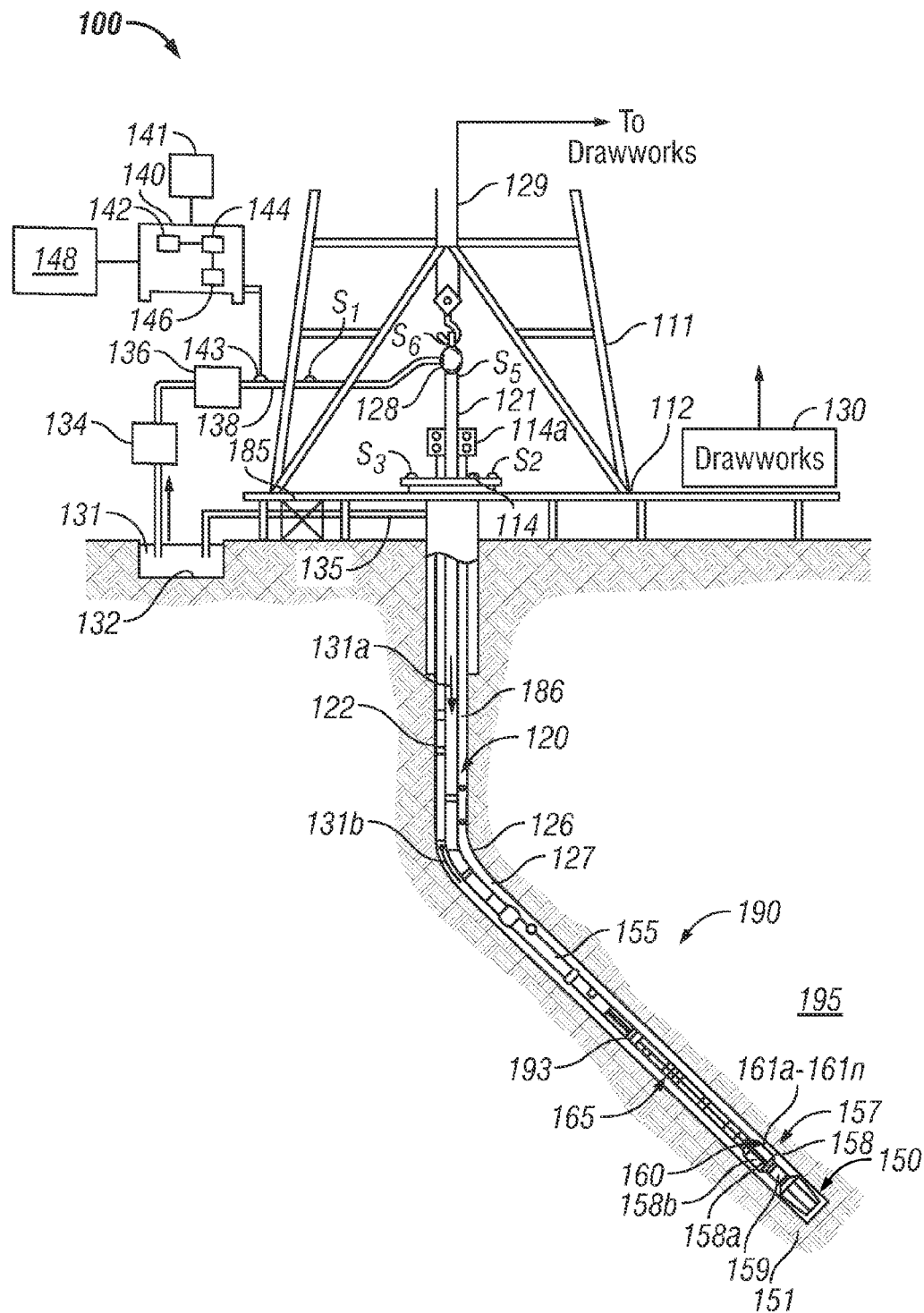
FIG. 1 is an elevation view of an exemplary drilling system suitable for use with the present disclosure.

FIG. 1 is a schematic diagram of an exemplary drilling system 100 that includes a drill string having a drilling assembly attached to its bottom end that includes a steering unit according to one embodiment of the disclosure. FIG. 1 shows a drill string 120 that includes a drilling assembly or bottomhole assembly (BHA) 190 conveyed in a borehole 126. The drilling system 100 includes a conventional derrick 111 erected on a platform or floor 112 which supports a rotary table 114 that is rotated by a prime mover, such as an electric motor (not shown), at a desired rotational speed. A tubing (such as jointed drill pipe) 122, having the drilling assembly 190, attached at its bottom end extends from the surface to the bottom 151 of the borehole 126. A drill bit 150, attached to drilling assembly 190, disintegrates the geological formations when it is rotated to drill the borehole 126. The drill string 120 is coupled to a drawworks 130 via a Kelly joint 121, swivel 128 and line 129 through a pulley. Drawworks 130 is operated to control the weight on bit ("WOB"). The drill string 120 may be rotated by a top drive (not shown) instead of by the prime mover and the rotary table 114. Alternatively, a coiled-tubing may be used as the tubing 122. A tubing injector 114a may be used to convey the coiled-tubing having the drilling assembly attached to its bottom end. The operations of the drawworks 130 and the tubing injector 114a are known in the art and are thus not described in detail herein.

A suitable drilling fluid 131 (also referred to as the "mud") from a source 132 thereof, such as a mud pit, is circulated under pressure through the drill string 120 by a mud pump 134. The drilling fluid 131 passes from the mud pump 134 into the drill string 120 via a desurger 136 and the fluid line 138. The drilling fluid 131a from the drilling tubular discharges at the borehole bottom 151 through openings in the drill bit 150. The returning drilling fluid 131b circulates uphole through the annular space 127 between the drill string 120 and the borehole 126 and returns to the mud pit 132 via a return line 135 and drill cutting screen 185 that removes the drill cuttings 186 from the returning drilling fluid 131b. A sensor $S_1$ in line 138 provides information about the fluid flow rate. A surface torque sensor $S_2$ and a sensor $S_3$ associated with the drill string 120 respectively provide information about the torque and the rotational speed of the drill string 120. Tubing injection speed is determined from the sensor $S_5$, while the sensor $S_6$ provides the hook load of the drill string 120.

In some applications, the drill bit 150 is rotated by only rotating the drill pipe 122. However, in many other applications, a downhole motor 155 (mud motor) disposed in the drilling assembly 190 also rotates the drill bit 150. The rate of penetration (ROP) for a given BHA largely depends on the WOB or the thrust force on the drill bit 150 and its rotational speed.

The mud motor 155 is coupled to the drill bit 150 via a drive shaft disposed in a bearing assembly 157. The mud motor 155 rotates the drill bit 150 when the drilling fluid 131 passes through the mud motor 155 under pressure. The bearing assembly 157, in one aspect, supports the radial and axial forces of the drill bit 150, the down-thrust of the mud motor 155 and the reactive upward loading from the applied weight-on-bit.

A surface control unit or controller 140 receives signals from the downhole sensors and devices via a sensor 143 placed in the fluid line 138 and signals from sensors $S_1$-$S_6$ and other sensors used in the system 100 and processes such signals according to programmed instructions provided to the surface control unit 140. The surface control unit 140 displays desired drilling parameters and other information on a display/monitor 141 that is utilized by an operator to control the drilling operations. The surface control unit 140 may be a computer-based unit that may include a processor 142 (such as a microprocessor), a storage device 144, such as a solid-state memory, tape or hard disc, and one or more computer programs 146 in the storage device 144 that are accessible to the processor 142 for executing instructions contained in such programs. The surface control unit 140 may further communicate with a remote control unit 148. The surface control unit 140 may process data relating to the drilling operations, data from the sensors and devices on the surface, data received from downhole, and may control one or more operations of the downhole and surface devices. The data may be transmitted in analog or digital form. Herein, "data" may refer to processed data, raw data, and signals.

The BHA 190 may also contain formation evaluation sensors or devices (also referred to as measurement-while-drilling ("MWD") or logging-while-drilling ("LWD") sensors) determining resistivity, density, porosity, permeability, acoustic properties, nuclear-magnetic resonance properties, formation pressures, properties or characteristics of the fluids downhole and other desired properties of the formation 195 surrounding the BHA 190. Such sensors are generally known in the art and for convenience are generally denoted herein by numeral 165. The BHA 190 may further include a variety of other sensors and devices 159 for determining one or more properties of the BHA 190 (such as vibration, bending moment, acceleration, oscillations, whirl, stick-slip, etc.) and drilling operating parameters, such as weight-on-bit, fluid flow rate, pressure, temperature, rate of penetration, azimuth, tool face, drill bit rotation, etc.) For convenience, all such sensors are denoted by numeral 159.

The BHA 190 may include a steering apparatus or tool 158 for steering the drill bit 150 along a desired drilling path. In one aspect, the steering apparatus may include a steering unit 160, having a number of force application members 161a-161n, wherein the steering unit is at partially integrated into the drilling motor. In another embodiment the steering apparatus may include a steering unit 158 having a bent sub and a first steering device 158a to orient the bent sub in the wellbore and the second steering device 158b to maintain the bent sub along a selected drilling direction.

The drilling system 100 may include sensors, circuitry and processing software and algorithms for providing information about desired dynamic drilling parameters relating to the BHA, drill string, the drill bit and downhole equipment such as a drilling motor, steering unit, thrusters, etc. Exemplary sensors include, but are not limited to drill bit sensors, an RPM sensor, a weight on bit sensor, sensors for measuring mud motor parameters (e.g., mud motor stator temperature, differential pressure across a mud motor, and fluid flow rate through a mud motor), and sensors for measuring acceleration, vibration, whirl, radial displacement, stick-slip, torque, shock, vibration, strain, stress, bending moment, bit bounce, axial thrust, friction, backward rotation, BHA buckling and radial thrust. Sensors distributed along the drill string can measure physical quantities such as drill string acceleration and strain, internal pressures in the drill string bore, external pressure in the annulus, vibration, temperature, electrical and magnetic field intensities inside the drill string, bore of the drill string, etc. Suitable systems for making dynamic downhole measurements include COPILOT, a downhole measurement system, manufactured by BAKER HUGHES INCORPORATED. Suitable systems are also discussed in "Downhole Diagnosis of Drilling Dynamics Data Provides New Level Drilling Process Control to Driller", SPE 49206, by G. Heisig and J. D. Macpherson, 1998.

The drilling system 100 can include one or more downhole processors at a suitable location such as 193 on the BHA 190. The processor(s) can be a microprocessor that uses a computer program implemented on a suitable machine readable medium that enables the processor to perform the control and processing. The machine readable medium may include ROMs, EPROMs, EAROMs, EEPROMs, Flash Memories, RAMs, Hard Drives and/or Optical disks. Other equipment such as power and data buses, power supplies, and the like will be apparent to one skilled in the art. In one embodiment, the MWD system utilizes mud pulse telemetry to communicate data from a downhole location to the surface while drilling operations take place. The surface processor 142 can process the surface measured data, along with the data transmitted from the downhole processor, to evaluate formation lithology. While a drill string 120 is shown as a conveyance system for sensors 165, it should be understood that embodiments of the present disclosure may be used in connection with tools conveyed via rigid (e.g. jointed tubular or coiled tubing) as well as non-rigid (e.g. wireline, slickline, e-line, etc.) conveyance systems. The drilling system 100 may include a bottomhole assembly and/or sensors and equipment for implementation of embodiments of the present disclosure on either a drill string or a wireline. A point of novelty of the system illustrated in FIG. 1 is that the surface processor 142 and/or the downhole processor 193 are configured to perform certain methods (discussed below) that are not in prior art.

Figure 2:
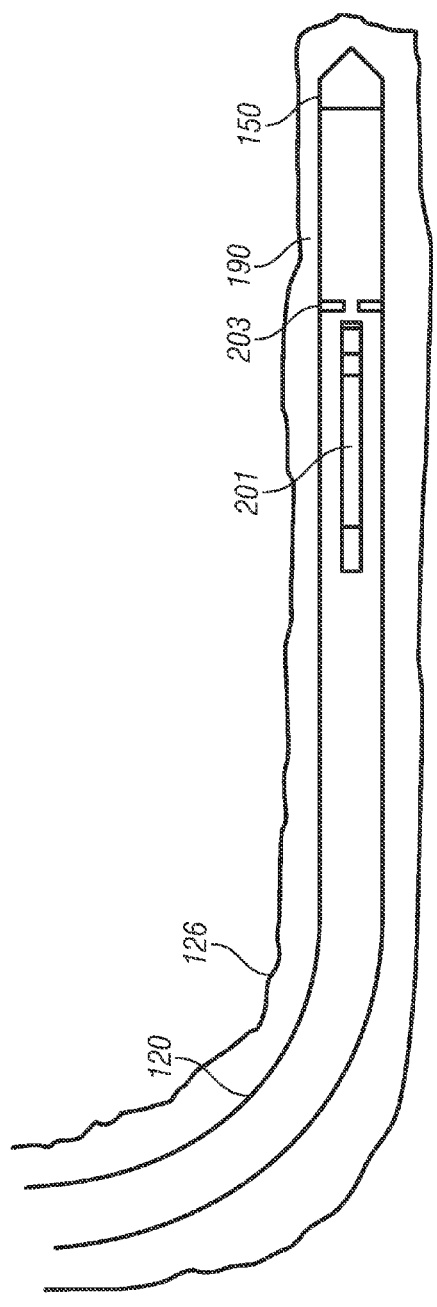
FIG. 2 illustrates a memory logging instrument deployed according to one embodiment of the present disclosure.

The principles of the present disclosure are illustrated in FIG. 2. After drilling is completed and prior to tripping the drillstring out of the borehole, a memory device/logging instrument 201 is dropped down the drillstring 120 until it engages a collet or encounter stop 203 on top of the BHA 190. As shown in FIG. 2, the logging instrument 201 is not attached to any tether or deployment device. If the logging instrument does not slide under gravity to the bottom where a preset tool stop is, the logging instrument would be pumped down using the pump 134. Once in place, the logging instrument would turn on to record data. The drillstring is then pulled out of the hole and time based measurements are made by the tool as the drillstring is pulled out.

The drillstring is pulled out at a known rate. The drilling depth as a function of time is recorded at surface from the driller station. After data are collected over a desired interval, the drillstring is pulled out at normal speeds. The logging instrument 201, still in the drillstring 120, is turned off. This may be done at a specified time, at a specified depth, or at a specified pressure. Once the logging instrument is retrieved, the time-based measurements made by the logging instrument are converted to give measurements as a function of depth and a log is produced. The logging instrument 201 may be retrieved prior to the drillstring 120 being pulled completely out of the borehole 126 using a slickline or some type of tether (not shown). A fishing head (not shown) may be provided to enable the slickline or some type of tether to pull the logging instrument out of the borehole.

Figure 3:
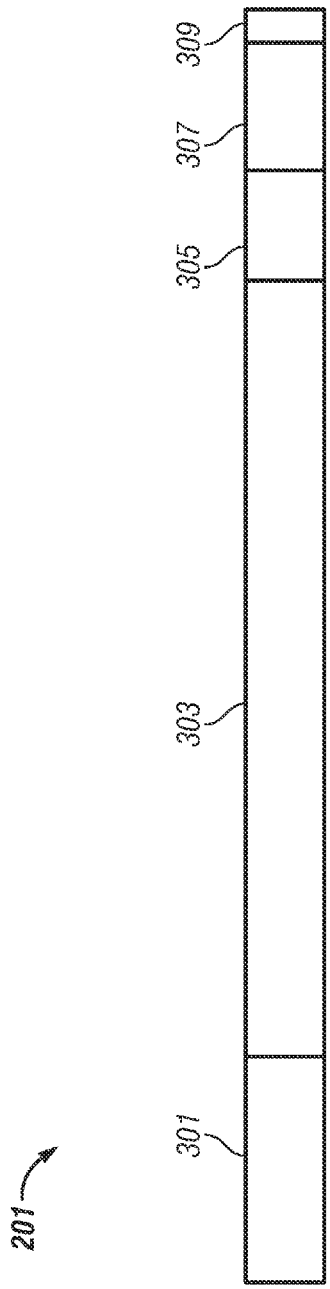
FIG. 3 illustrates the main components of the memory logging instrument.

FIG. 3 illustrates the main components of the logging instrument 201. It includes a section 301 for the battery and controller for the logging instrument. The section 303 includes the sensors used for making formation evaluation (FE) measurements. The section 305 includes swab cups with a bypass. The cups enable the logging instrument to be pumped into the borehole. A shock sub 307 is provided to absorb the impact of a hard landing such as when the logging instrument 201 is dropped into the borehole. The end of the tool is provided with a collet catcher 309 that engages the collet or stop 203 on the BHA 190.

A novel feature of the present disclosure is that no modification to the drillstring is needed for making the FE measurements. This is in contrast to prior art devices, which require a special sub on the drillstring or may require slots on the drillstring for making the FE measurements. Accordingly, the portion of the drillstring proximate to the sensor section 303 may be considered to be circumferentially homogenous, i.e., having a uniform composition and structure. Accordingly, there is a limited class of FE sensors that can be used to make measurements through a homogenous portion of the drillstring.

Figure 4:
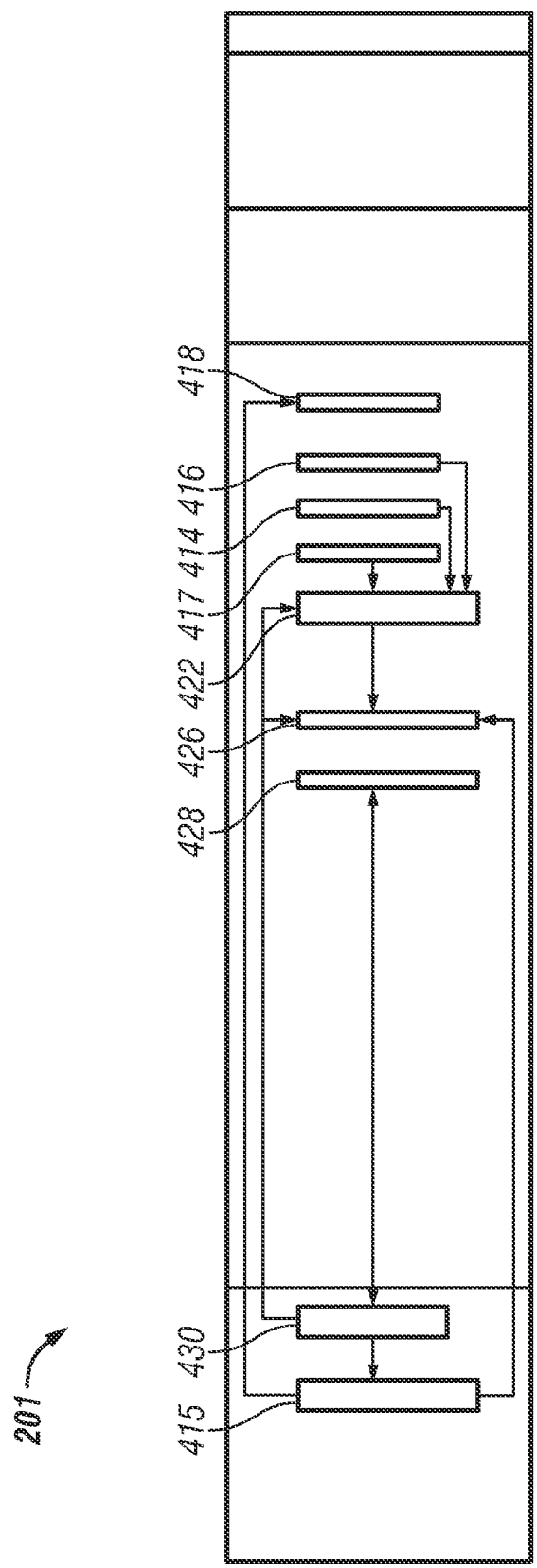
FIG. 4 shows a schematic with the main components of an exemplary pulsed neutron nuclear device used as an example of a "through-casing measurement logging tool" according to one embodiment of the present disclosure.

In one embodiment of the disclosure, the FE sensors include nuclear sensors. This is illustrated in FIG. 4. The system diagramed in FIG. 4 is a microprocessor-based nuclear well logging system using multi-channel scale analysis for determining the timing distributions of the detected gamma rays. Well logging instrument 201 includes an extra-long spaced (XLS) detector 417, a long-spaced (LS) detector 414, a short-spaced (SS) detector 416, and pulsed neutron source 418. In one embodiment of the disclosure, XLS, LS, and SS detectors 417, 414, and 416 are comprised of suitable material such as bismuth-germanate (BGO) crystals or sodium iodide (NaI) coupled to photomultiplier tubes. The use of BGO and NaI are exemplary and illustrative only, as other materials responsive to gamma rays or neutrons may be used in the detectors. To protect the detector systems from the high temperatures encountered in boreholes, the detector system may be mounted in a Dewar-type flask. This particular source, number of detectors and flask arrangement is an example only, and should not be construed a limitation. Also, in one embodiment of the disclosure, source 418 comprises a pulsed neutron source using a D-T reaction wherein deuterium ions are accelerated into a tritium target, thereby generating neutrons having energy of approximately 14 MeV. This particular type of source is for exemplary purposes only and not to be construed as a limitation. The filament current and accelerator voltage are supplied to source 418 through power supply 415.

The outputs from XLS, LS, and SS detectors 417, 414, and 416 are coupled to detector board 422, which amplifies these outputs and compares them to an adjustable discriminator level for passage to channel generator 426. Channel generator 426 is a component of multi-channel scale (MCS) section which further includes spectrum accumulator 428 and central processor unit (CPU) 430. MCS section accumulates spectral data in spectrum accumulator 428 by using a channel number generated by channel generator 426 and associated with a pulse as an address for a memory location. After all of the channels have had their data accumulated, CPU 430 reads the spectrum, or collection of data from all of the channels, and stores the data in a memory. In one embodiment of the disclosure, the detectors are gamma ray detectors. Alternatively, the detectors may be neutron detectors. The type of instrument deployed by this method can be any one of a number of instruments that are capable of measuring wellbore or formation properties through casing, including but limited to pulsed neutron logging tools, neutron porosity tools using chemical neutron sources, cased hole resistivity tools, or acoustic tools.

The measurements made by the logging instruments can be used for estimating many properties of the earth formation. These properties may include, but are not limited to, one or more of: porosity, fluid saturation, and elemental composition. Three or more detectors make it possible to measure high quality data, however, the method is not limited to the number of detectors utilized.

In one embodiment of the disclosure, the processor 430 is configured to process the measurements made by the detectors. This may be partial processing in which the raw measurements made by the detectors 416, 414, 417 are processed to give spectra. In another embodiment of the disclosure, the spectra may be processed by the processor 430 to give formation properties. The data stored in memory may be raw data, partially processed data or fully processed data. Implicit in the control and processing of the data is the use of a computer program on a suitable machine readable-medium that enables the processors to perform the control and processing. The term processor is intended to include devices such as a field programmable gate array (FPGA). The term processor is also intended to include multiple core or multiple processor systems.

The described computer-readable medium may include (i) a ROM, (ii) an EPROM, (iii) an EAROM, (iv) an EEPROMs, (v) a flash memory, (vi) a RAM, (vii) a hard drive, and (viii) an optical disk.

Figure 5:
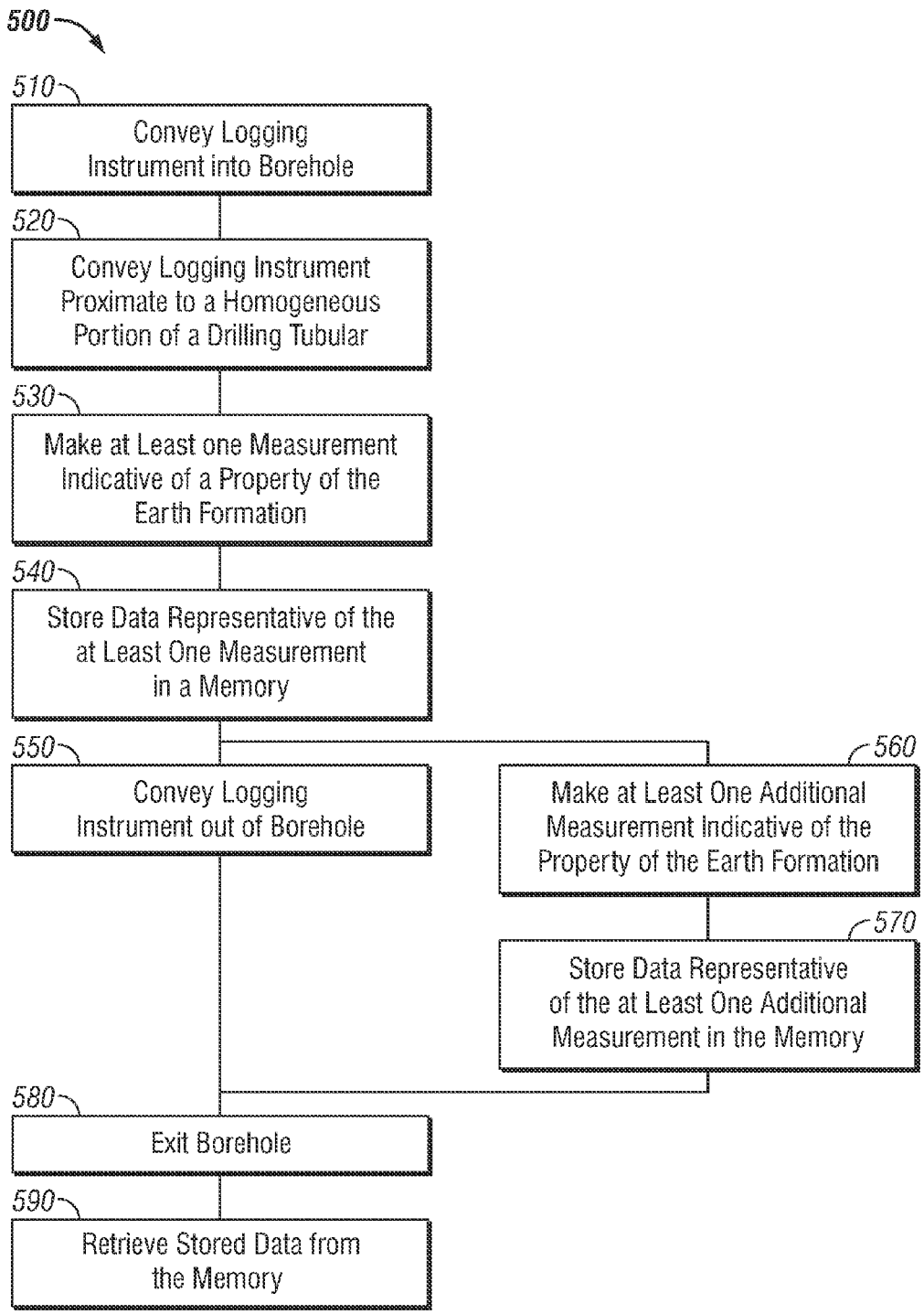
FIG. 5 is a flow chart of a method according to one embodiment of the present disclosure.

FIG. 5 shows a flow chart of a method 500 according to one embodiment of the present disclosure. In step 510, the logging instrument may be conveyed into the borehole in an earth formation using the drilling tubular. In some embodiments, the logging instrument may be dropped or pumped into the borehole. In step 520, the logging instrument may be conveyed to a position proximate to homogeneous portion of the drilling tubular. In step 530, a sensor on the logging instrument may make at least one measurement indicative of a property of the earth formation. In step 540, the data from the sensor may be recorded onto a memory by a processor. In step 550, the logging instrument is conveyed out of the borehole, that the logging instrument is traveling through the borehole away from the position proximate to the homogeneous portion but has not yet exited the borehole. In step 560, the sensor may make one or more additional measurements of the property indicative of the property of the earth formation or a measurement for a different property of the earth formation. In step 570, the data from the sensor may be recorded onto the memory by the processor. In some embodiments, multiple processors and/or multiple memories may be used. Steps 560 and 570 may be performed at the same time as step 550. In step 580, the logging instrument exits the borehole. Finally, in step 590, the stored data is retrieved for the memory.

Figure 6:
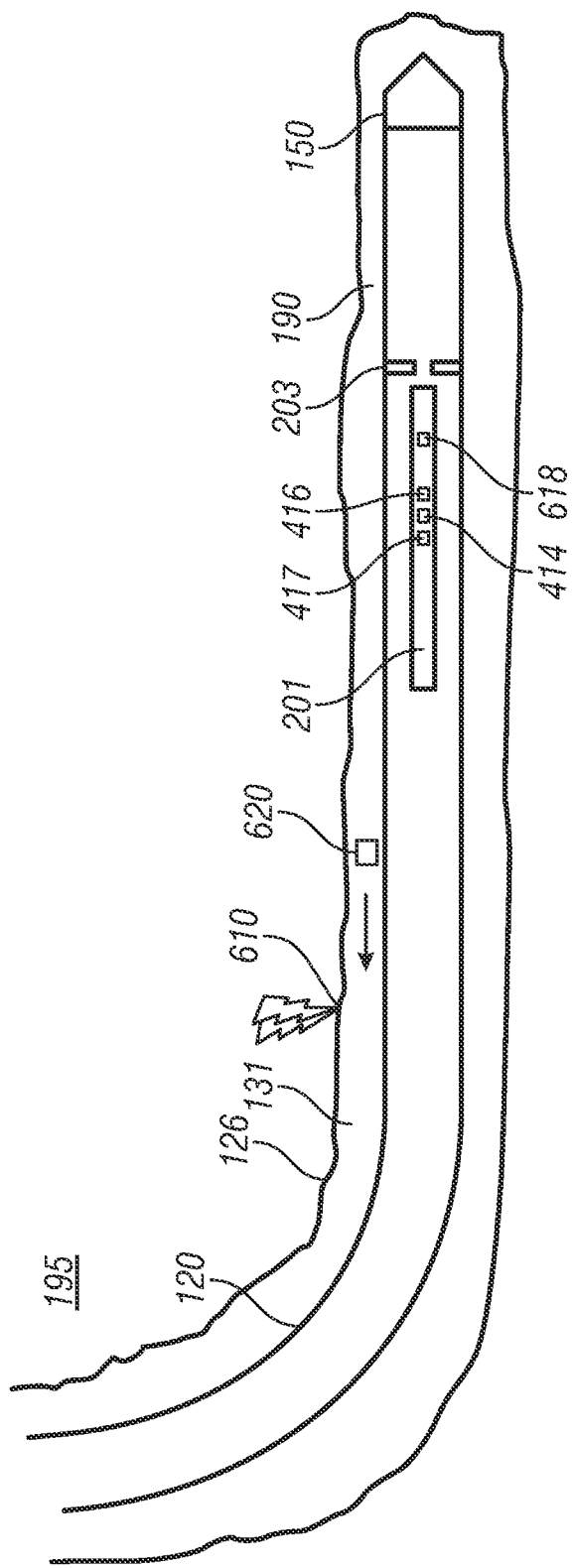
FIG. 6 shows a schematic of a wellbore with a leak according to one embodiment of the present disclosure.

FIG. 6 shows a schematic of a wellbore 126 with a leak (also referred to as lost circulation area) 610 that may allow drilling fluid 131 to flow into the earth formation 195. Logging tool 201 with a neutron source 618 and radiation detectors 414, 416, 417 may also be located in wellbore 126. Neutron source 618 may include one or more of: (i) a chemical neutron source and (ii) a pulsed neutron source. A radiation absorbing substance 620 may be added to the drilling fluid 131 such that the flow of the drilling fluid 131 into the earth formation 195 though the leak 610 causes the radiation absorbing substance 620 to accumulate at the location of the leak 610. The radiation absorbing substance 620 may include a neutron absorber. The radiation absorbing substance 620 may include a material with a high neutron capture cross section (high sigma value) as understood by one of skill in the art. The radiation absorbing substance 620 may emit gamma rays with a distinct energy peak(s) when irradiated by the neutron source 618. In some embodiments, the radiation absorbing substance may include boron or a chlorine containing material. The radiation absorbing substance 620 may be made of material that may be carried within and by the flow of the drilling fluid 131 within a wellbore 126, including, a solid, a liquid, a gel, and a particulate.

Figure 7:
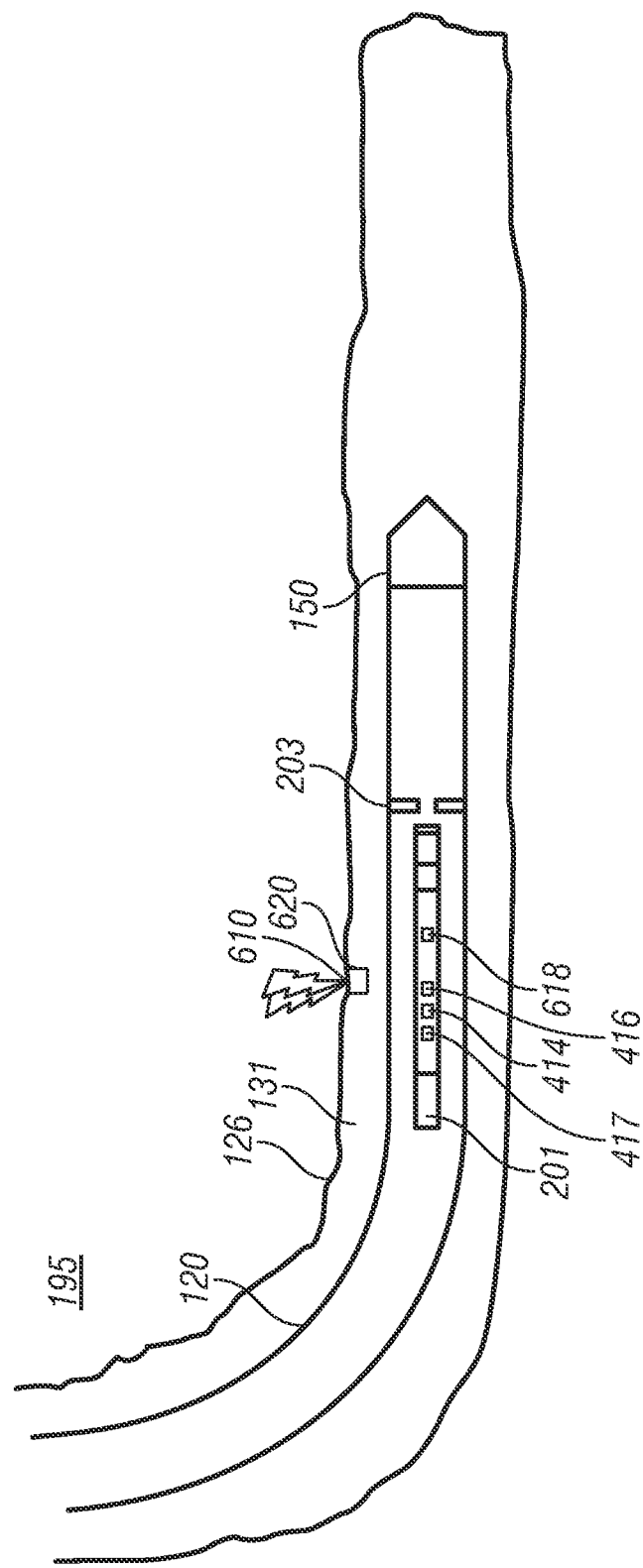
FIG. 7 shows a schematic of leak identification according to one embodiment of the present disclosure.

FIG. 7 shows a schematic of logging tool 201 with neutron source 618 and radiation detectors 414, 416, 417 in proximity to the leak 610 where the radiation absorbing substance 620 has accumulated. Logging tool 201 may include a memory for storing data generated by radiation detectors 414, 416, 417. The radiation detectors 414, 416, 417 may be configured to detect one or more of: gamma rays and neutrons. Interaction of the earth formation 195 with neutrons generated by source 618 may produce radiation that may be detected by one or more of radiation detectors 414, 416, 417. Since the radiation absorbing substance 620 may absorb the radiation produced by the earth formation interaction, one or more of the radiation detectors 414, 416, 417 may indicate a substance with a higher sigma value or a distinct energy peak when traveling in proximity to the radiation absorbing substance 620. Thus, the leak 610 may be located using the radiation detectors 414, 416, 417 in the wellbore 126. The use of three radiation detectors 414, 416, 417 is exemplary and illustrative only, as embodiments may be realized using one or more radiation detectors.

Figure 8:
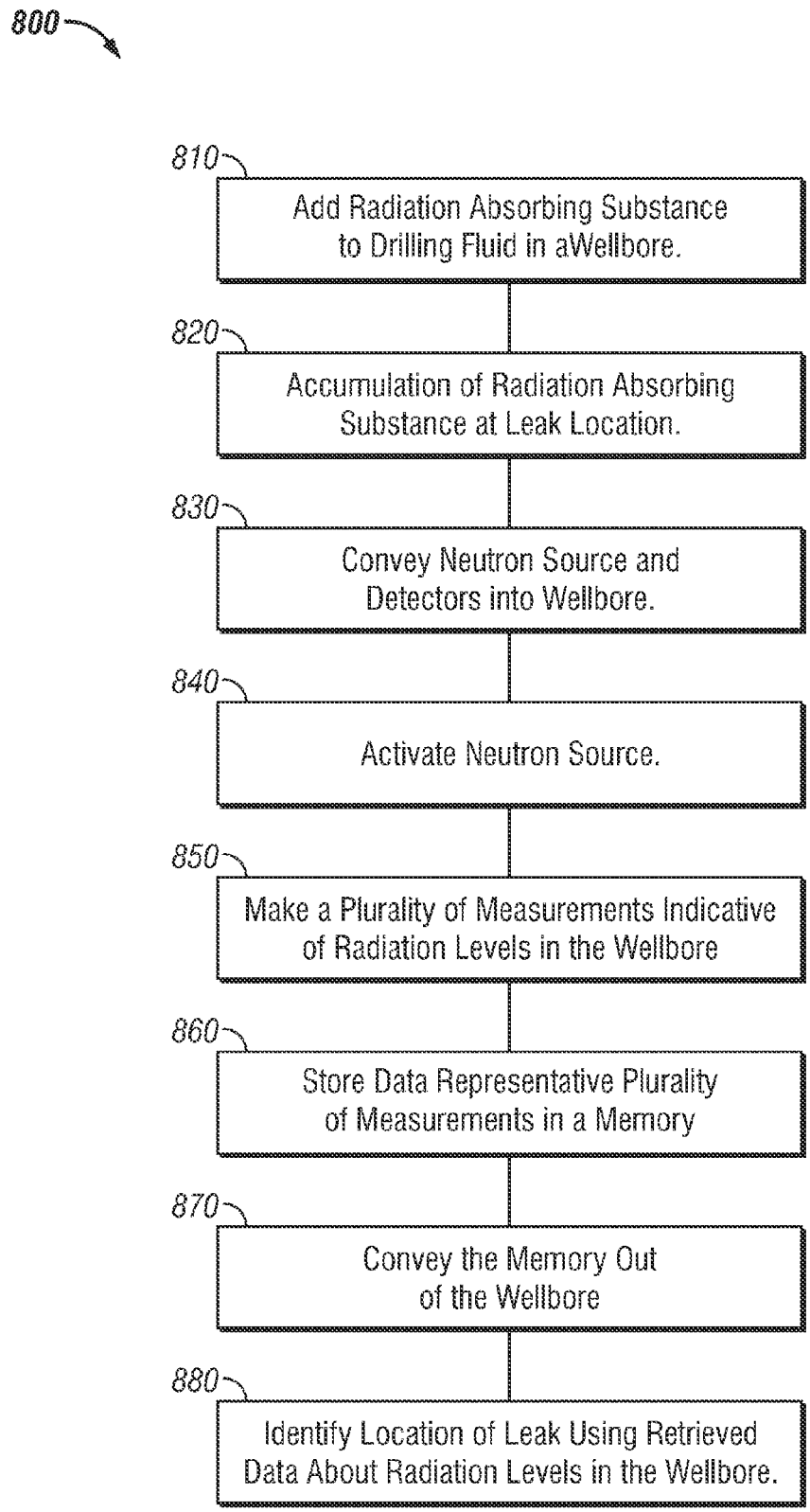
FIG. 8 is a flow chart of a method according to one embodiment of the present disclosure.

FIG. 8 shows a flow chart of a method 800 according to one embodiment of the present disclosure. In step 810, a radiation absorbing substance 620 may be added to drilling fluid 131 in wellbore 126. In step 820, the flow of drilling fluid 131 though a leak 610 in the wellbore 126 may cause drilling fluid 131 to egress from the wellbore 126 into the earth formation 195 and may cause an accumulation of radiation absorbing substance 620 at the location of the leak 610. In step 830, a neutron source 618 and one or more radiation detectors 414, 416, 417 may be conveyed into the wellbore 126. The neutron source 618 and the radiation detector(s) 414, 416, 417 may be disposed on a logging tool 201 on a BHA 190. The logging tool 201 may be conveyed in the wellbore 126 through a drilling tubular 120. In some embodiments, one or more of steps 810 and 820 may take place after or during step 830. In step 840, the neutron source 618 may be activated. In some embodiments, step 840 may be optional, as the neutron source may be continuously active. The neutron source 618 may include at least one of: a chemical neutron source and a pulsed neutron source. The neutrons from the neutron source 618 may interact with the earth formation 195 to produce radiation that may be detected by radiation detectors 414, 416, 417, In step 850, a plurality of measurements of radiation levels may be made using the radiation detectors 414, 416, 417. In step 860, the plurality of measurements may be stored in a memory on logging tool 201. In step 870, the memory may be conveyed out of the wellbore 126. In step 880, the location of the leak 610 may be identified using retrieved data from the memory of logging tool 201. The identification may include determining at what location (depth, distance of travel along the wellbore, azimuth, etc.) the radiation measurements may indicate a higher sigma or a distinct energy peak within the wellbore 126 due to absorption of radiation by the accumulated radiation absorbing substance 620.

What is claimed is:

1. A method for locating a leak in a wellbore penetrating an earth formation, the method comprising:
adding a radiation absorbing substance to a drilling fluid in the wellbore;
conveying a neutron source and at least one radiation detector along at least part of the wellbore through a drilling tubular, the at least one radiation detector being responsive to an interaction between the neutron source and the earth formation; and
identifying a location indicative of the leak by identifying an accumulation of the radiation absorbing substance using an output of the at least one radiation detector.

2. The method of claim 1, wherein the neutron source and the at least one radiation detector are disposed on a logging tool.

3. The method of claim 2, further comprising:
storing data representative of the output of the at least one radiation detector in a memory disposed in the logging tool using a processor.

4. The method of claim 1, wherein the radiation absorbing substance has a high neutron capture cross section.

5. The method of claim 4, wherein the radiation absorbing substance includes one or more of: (i) boron and (ii) chlorine.

6. The method of claim 1, wherein the neutron source includes at least one of: (i) a chemical neutron source and (ii) a pulsed neutron source.

7. The method of claim 1, wherein the at least one radiation detector includes one of: (i) a gamma ray detector and (ii) a neutron detector.

8. The method of claim 1, wherein the location indicative of the leak is indicated by a distinct energy peak.

9. An apparatus for locating a leak in a wellbore penetrating an earth formation, the apparatus comprising:
a neutron source configured to be conveyed along at least part of the wellbore;
at least one radiation detector configured to be conveyed along at least part of the wellbore through a drilling tubular and configured to provide an output indicative of an interaction between the neutron source and the earth formation;

a radiation absorbing substance conveyed in a drilling fluid and configured to accumulate at a location indicative of the leak, and a processor configured to identify the location indicative of the leak by identifying an accumulation of the radiation absorbing substance using the output of the at least one radiation detector.

10. The apparatus of claim 9, wherein the neutron source and the at least one radiation detector are disposed on a logging tool.

11. The apparatus of claim 10, further comprising:
a memory disposed on the logging tool; and
wherein the processor is configured to store data representative of the output of the at least one radiation detector in the memory.

12. The apparatus of claim 9, wherein the radiation absorbing substance has a high neutron capture cross section.

13. The apparatus of claim 12, wherein the radiation absorbing substance includes one or more of: (i) boron and (ii) chlorine.

14. The apparatus of claim 9, wherein the neutron source includes at least one of: (i) a chemical neutron source and (ii) a pulsed neutron source.

15. The apparatus of claim 9, wherein the at least one radiation detector includes one of: (i) a gamma ray detector and (ii) a neutron detector.

16. A non-transitory computer-readable medium product having thereon instructions that when read by a processor cause the processor to execute a method, the method comprising:

identifying a location indicative of a leak in a wellbore penetrating an earth formation by identifying an accumulation of a radiation absorbing substance at the location indicative of the leak using an output of at least one radiation detector conveyed in a drilling tubular, the at least one radiation detector responsive to an interaction between radiation from a neutron source and the earth formation.

17. The non-transitory computer-readable medium product of claim 16, wherein the non-transitory computer-readable medium may include at least one of: (i) a ROM, (ii) an EPROM, (iii) an EAROM, (iv) an EEPROMs, (v) a flash memory, (vi) a RAM, (vii) a hard drive, and (viii) an optical disk.

* * * * *